March 15, 1927.
N. E. BRICE ET AL
WATER SOFTENER
Filed Oct. 6, 1924
1,620,717
3 Sheets-Sheet 1
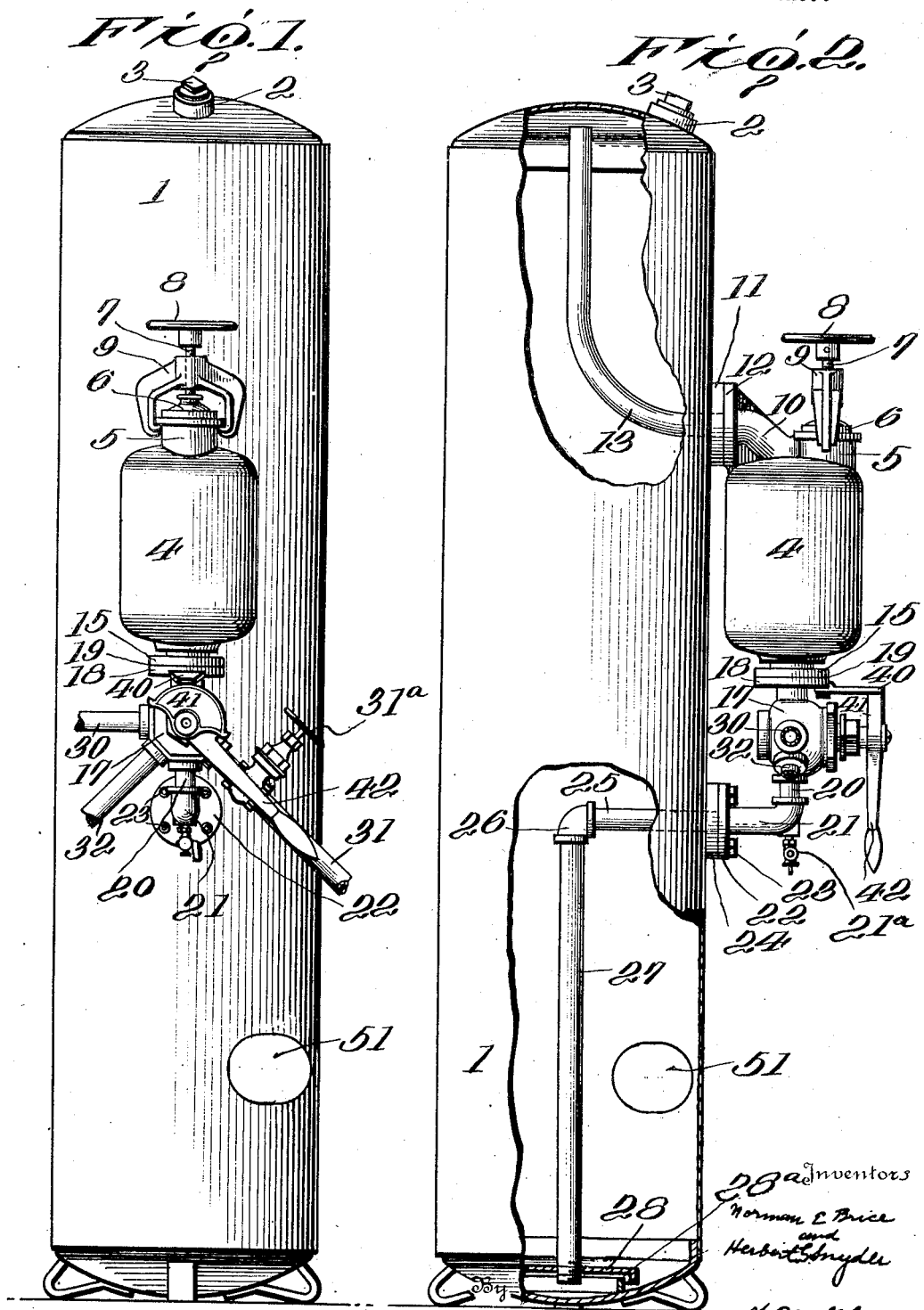

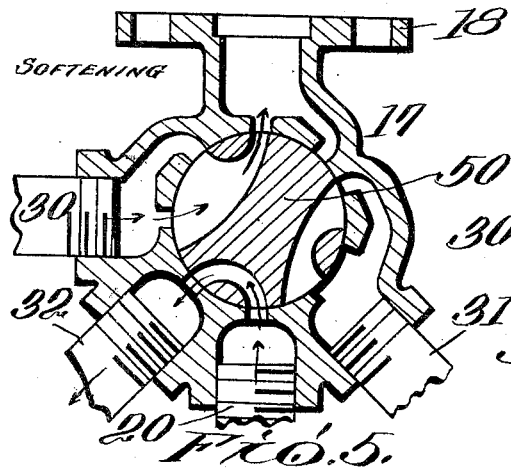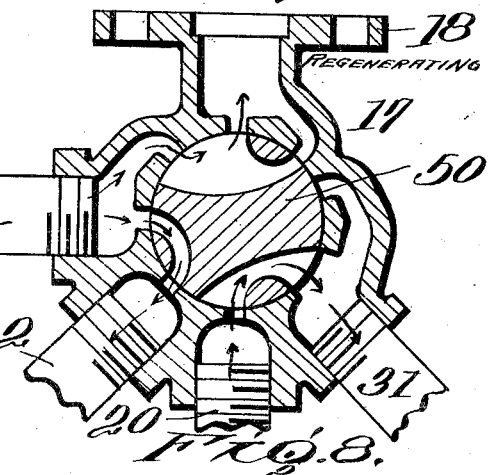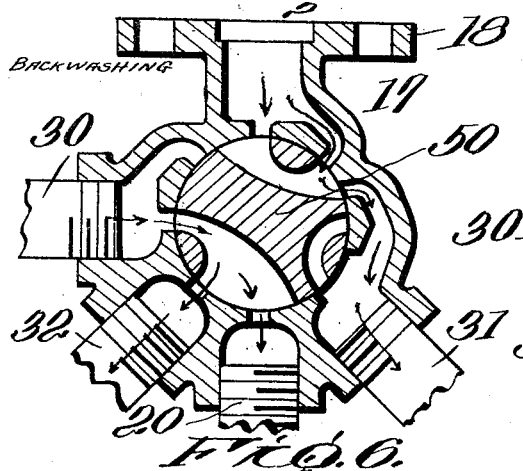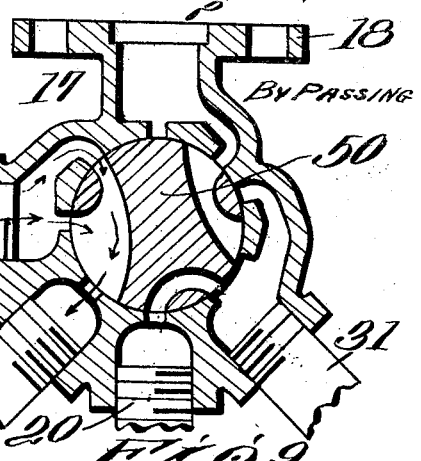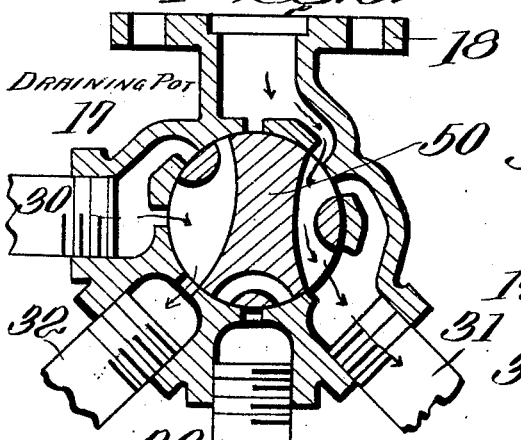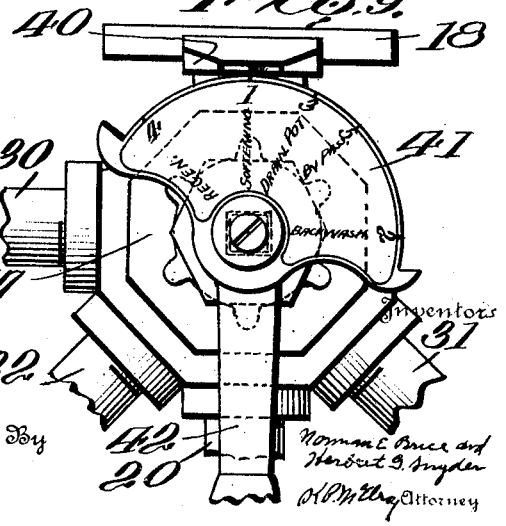

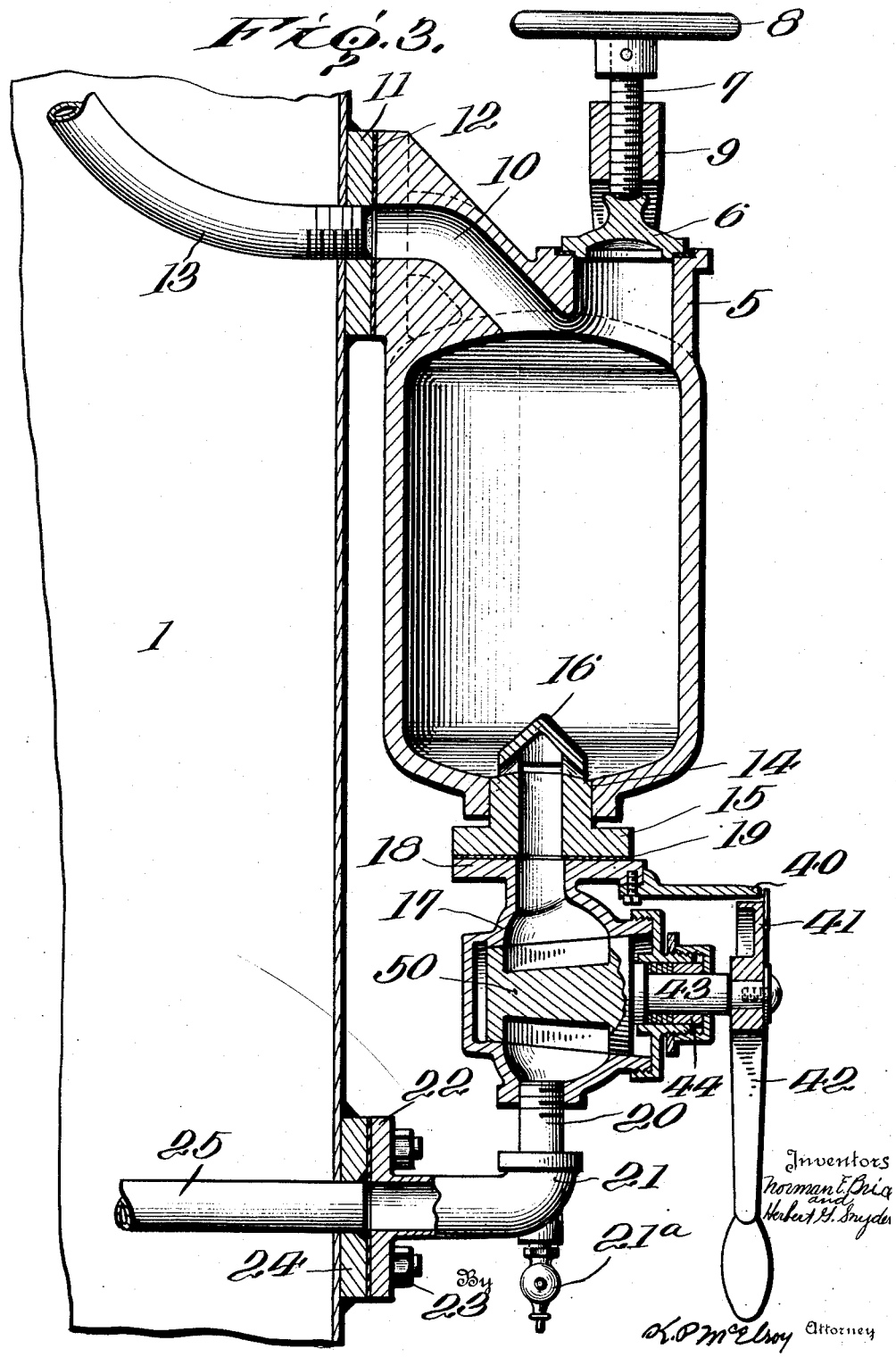

Patented Mar. 15, 1927.

1,620,717

UNITED STATES PATENT OFFICE.

NORMAN E. BRICE, OF BROOKLYN, AND HERBERT G. SNYDER, OF NEW YORK, N. Y., ASSIGNORS TO THE PERMUTIT COMPANY, OF NEW YORK, N. Y., A CORPORATION OF DELAWARE.

WATER SOFTENER.

Application filed October 6, 1924. Serial No. 742,027.

This invention relates to water softeners; and it comprises a shell or container for exchange silicates, and a multi-way cock, with connections leading from a source of water supply through the cock to one side of the bed of exchange silicates, and connections leading from the other side of the bed of exchange silicates to the cock and thence to a point of use, connections leading from the source of water supply through the cock and to a point of use, and connections leading from the softener through the cock to a point of waste whereby the softener may be used in line with a source of supply of water and whereby through simple manipulation of the cock and through the use only of two connections or pipes leading from the cock to different points in the softener, the water from the source of supply may be softened, the exchange silicates in the softener may be backwashed, the exchange silicates may be regenerated and rinsed, the salt receptacle (when one is used in the line leading to the shell) may be drained, and the entire softener may be by passed so water directly from the source of supply may be obtained in every position of the cock except the softening position, at which time soft water is obtained; all as more fully hereinafter set forth and as claimed.

In the art of softening water, the exchange silicate method has now come into extensive use. Generally, such method consists in passing hard water to be softened through a bed of exchange silicates, backwashing the bed in order to remove dirt which may have accumulated in the bed from the hard water during softening, and regenerating or revivifying the exchange silicates by passing salt water through the bed and rinsing out the adhering salt solution.

Apparatus for this purpose have usually included a number of valved pipes or lines leading to different parts of the exchange silicate container, salt receptacles in which salt solution is made and from which it is delivered to the container, and necessary valves and connections for the purpose of performing the process described. Sometimes, these valves are separately and manually operated and sometimes, they are activated through metering devices, but in these instances, there are several valves to be controlled and the connections are complicated and more or less involved. Apparatus of the type described are useful and successful in large manufacturing plants where soft water is needed and can be readily operated by an ordinary workman and engineer. They are usually of relatively large capacity and require very little attention, especially when equipped with metering devices and ordinary valve controlled mechanism. But with increased demand for soft water in small plants, hotels and residences, there is a concomitant need for simple apparatus which can be operated by unskilled persons and which can be inexpensively manufactured and installed.

Among other objects of the present invention is the provision of a simple, easily operated softener and the provision of a softener which can be inexpensively made and which can be sold at a comparatively low price for household and small factory use, although, of course, not so limited. This is accomplished by connecting the spaces above and below the bed of exchange silicates in the softener and all the pipe lines leading to and coming from the softener (ordinarily controlled by separate valves) to one five-way cock, and by providing in one connection between the bed of exchange silicates and the cock, sufficient space for such amount of salt or brine as is required to regenerate the bed of exchange silicates.

According to the present invention, the softener is installed in the line leading from the source of water supply and is arranged so that it may be bypassed, so that a user may obtain either the soft water or the usual water from the ordinary supply by simple manipulation of a single cock.

By the arrangement all the water passes through the cock including the water to be softened, the soft water, the rinsing water, and the hard water, or unsoftened water when the softener is bypassed.

The cock is arranged with a convenient handle carrying a dial, and a pointer is provided so that the handle can be set in proper position, a test cock is provided for sampling the water, if occasion demands, and the passage leading to waste is provided with a valve, advantageously a needle valve, so that there is provided a water rate control.

In the accompanying drawings,

Fig. 1 is a front elevation of the softener showing the salt pot and cock;

Fig. 2 is a side elevation with the softener broken away at the top and the bottom, showing pipes inside;

Fig. 3 is an enlarged section showing a segment of the softener and illustrating a vertical section through the salt pot and the cock;

Fig. 4 is a vertical section through the cock when it is set for softening position;

Fig. 5 is a similar view when the cock is set for backwashing position;

Fig. 6 is a similar view when the cock is set for draining the salt pot;

Fig. 7 is a similar view when the cock is set for regenerating;

Fig. 8 is a similar view when the cock is set to bypass the softener entirely; and Fig. 9 is a plan of the face of the cock showing the operating lever (and position-indicating dial).

Referring to the drawings, 1 indicates a softener having an opening 2 and plug 3 for the purpose of supplying the softening material and which also may be used in introducing the salt or brine for regeneration. Located at a convenient height is the salt pot 4 provided with the neck 5 having the opening closed by gasket and cover 6 arranged to be held in place by the screws 7 operated by hand wheel 8, the screw passing through the brackets 9. Salt pot 4 may consist of a casting having the passage 10 and it is bolted to the softener shell through the flange 11 provided with a gasket 12. From the flange connection 11, the pipe 13 leads inside the softener and terminates at a relatively high point therein, as shown. To the bottom of the salt pot is connected the flange member 15 carrying the guard 16 extending inside the salt pot, such guard serving to prevent direct flow of salt through the flange member 15. The cock casing designated as a whole as 17 is provided with a flange portion 18 which is securely bolted to the flange member 15 with the gasket 19 therebetween. To the cock casing at the lowermost part is attached the elbow casting 21 having a flange 22 bolted by means of bolts 23 to a plate 24 on the softener shell. From plate 24, pipe 25 leads into the softener and this is connected by elbow 26 to pipe 27 terminating in guard plate. Plate 28 is spaced from the bottom of the softener shell and a ring 28ᴬ is provided so that the pipe 27 is kept free of softening material or gravel supporting such softening material, and the fluids may be removed or delivered as the case may be and distributed over the bottom of the softener, and, furthermore, so that no pockets may be formed in which salt solution can accumulate.

The cock casing is also provided with an inlet 30 which leads to the water supply, with the pipe 31 which leads to waste and with the pipe 32 which leads to a point of use. As shown in Fig. 8, the softener may be entirely bypassed, for instance, and water from the source of supply may come in through connection 30 and out through 32 in order that a user may obtain water without passing it through the softener.

Referring particularly to Fig. 4, when it is desired to soften hard water, the user turns the cock to softening position, which is that shown in Fig. 4. Water to be softened enters the cock through pipe 30 and goes upwardly, as is indicated by the arrows through the salt pot (there being no salt in the salt pot), thence through line 13 to the top of the softener, thence downwardly to and through the guard plate 28 to the bottom of pipe 27, through pipe 27 to pipe 25, through elbow casting 21, thence through the cock, as is indicated by arrows, and out through 32 to the point to use. Before regeneration, the softener may be backwashed. Of course, backwashing may be interpolated between any of the steps, but in most cases it is advisable to backwash the softener after the softening step, in order to remove from the bed any dirt which may have accumulated from the hard water at the surface of the bed and to loosen up the bed which has been compressed by the downward passage of the water. Backwashing position of the cock is shown in Fig. 5. Water enters through 30 to the cock casing, some of it passing to 32 (so water from the source may be obtained even during backwashing), but the balance passing through the cock casing to pipe 20, pipe 21, pipe 25, pipe 27 to the bottom of the softener, thence flowing upwardly and being removed from the softener through pipe 13, down through the salt pot (which now contains no salt), thence to the cock casing and to waste through 31, as is indicated by the arrows in Fig. 5.

When it is desired to regenerate the exchange materials, the salt pot must first be drained of any water contained therein. This is done by placing the cock in the position marked "draining pot". It will then be in the position shown in Fig. 6 of the drawing. Water from the salt pot will then drain outwardly through the cock, as is indicated by arrows in Fig. 6, and go to waste through 31, valve 31ᴬ being open. At this time, water from the source may be obtained even while the cock is in position shown in Fig. 6.

The salt pot is then filled with salt or brine. The size of the salt pot is calculated for one regeneration. If brine is to be used, the pot will be larger than if salt is to be used. The cock is turned to the position indicated in Fig. 7, i. e., the regeneration position, and the water flows through pipe 30 to the cock passing up through the salt pot to dissolve the salt. The salt solution thus formed then passes through the pipe 13 in the softener and downwardly through the bed of exchange material and then upwardly through pipes 27 and 25 into the 5-way cock, as is indicated by arrows in Fig. 7, and running to waste through pipe line 31, valve 31^A being set to regulate the flow. This is continued until all the salt is removed from the salt pot and until the bed is thoroughly regenerated and rinsed free of salt solution. If during regeneration water is required in the supply line 32, it will flow through the opening in the cock which connects the inlet pipe 30 with the outlet pipe 32, Fig. 7. Water passing through that connection will not come into any contact with the salt solution.

According to the present invention, the cock controlling the direction of the flow of water through or by-passing the softener, is arranged at a convenient height for handling and so that its dial settings may be observed by the average person and the salt pot in the line leading to the softener is located at a convenient height for the introduction of the necessary amount of salt or brine when the exchange silicates are to be regenerated. It is sometimes convenient to use the opening 2 at the top of the shell (Figure 1) above the bed of exchange silicates, for introducing salt. And an enlargement in the pipe 13 of the softener may be used and this enlarged part may be provided with a filling opening arranged at a convenient height. In effect, the salt pot may be considered an enlargement of this pipe 13. The size and shape of the softener and the amount of salt required for regeneration will determine the general arrangement. The drawings show, as an example, an arrangement which is convenient, assuming that the depth of the bed exceeds three feet. The filling opening for the salt is at a convenient height, so that when regeneration is necessary, the user may easily put the required amount of salt in the salt pot. In this arrangement, the cock is conveniently located, advantageously directly beneath the salt pot and the cock is provided with five passages, one such passage leading to the salt pot which, in turn, is arranged to direct water or solution to the top of the softener, another such passage is arranged for connection to the source of water supply, another such passage leading to a point of use for soft water or for water bypassing the softener, another such passage leading to waste, and still another such passage leading to the low point in the softener.

The arrangement is such that the softener may be coupled directly to the water system of a house. In this event, when the householder does not wish to use softened water, the softener may be bypassed by throwing the cock to the position shown in Fig. 8. Water then simply enters through 30 and goes out through 32 to the point of use, during which period pressure is completely removed from the softener shell by virtue of the fact that the top of the softener is connected through ports in the cock to the waste line 31. On line 31 is a valve which may be a needle valve 31^a. This is preferably equipped with a dial and a pointer so that it may be set to the same position each time it serves one of its various purposes. It can be set to control the flow of fluids during backwashing, rinsing and regenerating. It prevents the softener being washed at an excessive rate and prevents the salt solution passing through the bed too rapidly. This valve constitutes a manually operated water rate control.

In order that a sample of the soft water, or a sample of the rinsed water at the end of regeneration may be taken, sample cock 21^A is provided on elbow casting 21.

Connected to flange 18 of the 5-way cock is a pointer 40. The key 50 of the cock carries a shaft 43 to which, outside of the stuffing box, is attached a handle 42 for moving the key and a dial plate 41. The dial plate is provided with indicia (see Fig. 9) which, when positioned opposite the mark of the pointer 40, indicate the positions of the key, as shown in Figs. 4 to 8. It is only necessary for the operator to position the dial and thus the cock in the different positions, such as softening position, backwash position, drain position, regeneration position and bypass position.

Suspended matter which may be carried into the softener during the softening period accumulates in the bed and is removed and flushed out by the backwash water. The passages for the backwash water, particularly in the key are arranged without pockets or traps so that dirt or grit carried by the backwash water can and will be flushed out and cannot settle down and accumulate in these passages.

The softener described is particularly adapted for household use. When desired to remove the regenerating material from the softener shell, this may be done by removing the cover of the handhole 51. The softener may be attached in line to the city main or the normal source of water supply, and since the softener can be bypassed at any time by placing the cock in the position shown in Fig. 8, the user may obtain the water as it comes from the source of supply and also, since by simple manipulation of the handle 42, the softener can be thrown in operative position, the user may obtain soft water at any time.

What we claim is:—

1. Apparatus for softening water, comprising a container, exchange silicates therein, connections leading to a high point therein, connections leading to a low point therein, in combination with a multi-way cock having two ports, each in communication with one of said connections and means at a point between said cock and the exchange silicates for holding salt, said cock having a water supply port, a port for water to be used and a waste water port, together with a rotor arranged to be positioned in the regenerating phase of said apparatus to establish communication through the cock from the water supply port, through one of said connections, through the salt holding means, through the container, through the other connection back to the cock and to the waste port, while separately establishing communication through the cock from the water supply port to the port for water to be used, whereby, during regeneration, water from the water supply port may be obtained.

2. Apparatus for softening water, comprising a container, exchange silicates therein, a connection leading to a high point therein, a connection leading to a low point therein, in combination with a multi-way cock having two ports, each in communication with one of the said connections, said cock having a water supply port, a port for water to be used, and a waste water port, together with a rotor arranged to be positioned in the back-washing phase of said apparatus to establish communication through the cock from the water supply port, through one of said connections, through the container, through the other connection back to the cock and to the waste port, while separately establishing communication through the cock from the water supply port to the port for water to be used, whereby, during back-washing, water from the water supply port may be obtained.

3. Apparatus for softening water, comprising a container, exchange silicates therein, a connection leading to a high point therein, a connection leading to a low point therein, in combination with a multi-way cock having two ports each in communication with one of the said connections, said cock having a water supply port, a port for water to be used and a waste water port, together with a rotor arranged to be positioned so that the container may be by-passed to establish communication through the cock from the water supply port and to the port of use, while closing the two ports leading to the container connections and the port leading to waste.

4. Apparatus for softening water, comprising a container, exchange silicates therein, connections leading to a high point therein, connections leading to a low point therein, a combination with a multi-way cock having two ports, each in communication with one of said connections and means at a point between said cock and the exchange silicates for holding salt, said cock having a water supply port, a port for water to be used and a waste water port, together with a rotor arranged to be positioned so that the means between the cock and the exchange silicates for holding salt may be drained and to establish communication from the water supply port to the port of use while establishing separate communication from the salt-holding means in the connection between the cock and exchange silicates, through the cock and to the waste port, whereby, when the salt holding means is drained water may be obtained from the water supply port through the cock and through the port for water to be used.

5. The combination with apparatus through which liquids are to be passed of a connection leading to a high point in such apparatus and a connection leading to a low point in such apparatus together with a multi-way cock having ports to which said connections are connected, the said cock also having a liquid supply and a port leading to a point of use of said liquid, and a rotor for the said cock arranged to be positioned to divide the liquid coming from the port of supply into two streams, and simultaneously establish communication through the cock for one stream through the said connections and the said apparatus and for the other stream through the cock to the port of use.

6. The combination with apparatus through which liquids are to be passed having a connection leading to a high point to a connection leading to a low point of a multi-way cock having ports to which said connections are connected and having a water supply port for water to be passed through the said apparatus, a port leading to a point of use of said water and a waste port, and a rotor for the said cock arranged to be positioned to divide the liquid coming from the water supply port into two streams and to simultaneously establish communication through the cock for one stream through one of said connections, through the said apparatus back to the cock, through the other connection and through the waste port and for establishing communication for the other stream from the water supply port to the port of use.

7. A multi-way cock for exchange silicate softeners and the like comprising a casing provided with a plurality of ports, a plurality of said ports being subdivided, and a rotor arranged for positioning with respect to said subdivisions to divide a stream of liquid entering one port so that it is sent out of two other ports of the casing.

8. A multi-way cock for exchange silicate softeners comprising a casing provided with at least four ports, some of said ports being subdivided and a rotor arranged for positioning with respect to said subdivisions to divide a stream of liquid entering one port so that it is sent out of two other ports of the casing while at the same time permitting liquid to flow into a third port and out of a fourth port of the casing.

9. A multi-way cock for exchange silicate softeners and the like comprising a casing provided with two inlet ports and three outlet ports, one inlet port being subdivided, and a rotor shaped so that it may be positioned with respect to the one inlet port and its subdivision to divide a stream of liquid entering the casing from that inlet port into two streams and to send one stream out of one outlet while sending the other stream out of the other outlet, and the rotor being further shaped so that water entering the second inlet is directed through the remaining outlet.

10. The combination with an exchange silicate softener having connections for delivering liquids to high and low points thereof, of a multi-way cock between said connections, said multi-way cock having a port for entrance of raw water, a port for exit of raw water or softened water, an outlet for raw water leading to one of said connections, an inlet for soft water leading from one of said connections, and a waste port, together with a rotor so shaped as to permit positioning in any one of a number of positions with respect to said ports whereby, during the softening phase, hard water will enter through said cock, pass through the softener, again enter said cock and pass through the soft water outlet, and, during the regenerating phase, hard water will be divided into two streams, one passing through the hard water inlet and out of the port of use, while the other passes through the cock to one connection of the softener, through the softener, through the other connection back to the cock and thence to the waste port.

11. The combination with an exchange silicate softener having connections for delivering liquids to high and low points thereof, of a multi-way cock between said connections, said multi-way cock having a port for entrance of raw water, a port for exit of raw water or softened water, an outlet for raw water leading to one of said connections, an inlet for soft water leading from one of said connections, and a waste port, together with a rotor so shaped as to permit positioning in any one of a number or a plurality of positions whereby, during the softening phase, four ports of the said cock are open and the waste port closed, and whereby the cock may be positioned for regenerating, backwashing, by-passing and draining, and during the same permit water to flow through the cock from the source of supply to the point of use.

12. The combination with an exchange silicate softener of a multi-way cock comprising a casing having a plurality of ports and a rotor so shaped as to open and close different ports depending upon the phase of operation, said rotor being provided with a handle and indicia associated with the cock, so that the operator may position the rotor for softening, regeneration, backwashing, by-passing, or for draining, by means of the indicia.

13. Apparatus for softening water comprising a container, exchange silicates therein, a multi-way valve, a connection leading from said valve to a high point in said container, a connection leading from said valve to a low point in said container, and connections from said valve with a source of water supply, a point of consumption, and a point of disposal as waste, said valve being so shaped that in all of its positions water is available for use.

14. Apparatus for softening water comprising a container, exchange silicates therein, connections leading to a high point therein, a salt pot in connection therewith, connections leading to a low point in said container, in combination with a multi-way valve capable of assuming various positions wherein, in water softening position water from a source of supply can be directed to the top of said container and from the bottom of said container to a point of use; wherein, in regenerating position, water from a source of supply can be directed through said salt pot to the top of said container and from the bottom of said container to a point of disposal as waste; wherein, in draining position, communication can be established between the source of supply and the point of consumption and at the same time communication made between the salt pot and the point of disposal as waste; wherein, in backwashing position, water from a source of supply to the lower portion of said chamber and from the upper portion of said chamber passes to a point of disposal as waste; and wherein, in by-pass position, water from a source of supply is led directly to a point of consumption.

In testimony whereof, we have hereunto affixed our signatures.

NORMAN E. BRICE.
HERBERT G. SNYDER.